United States Patent [19]
Aidlin et al.

[11] Patent Number: 5,421,678
[45] Date of Patent: Jun. 6, 1995

[54] METHOD AND APPARATUS FOR CONVEYING BOTTLES

[76] Inventors: Samuel S. Aidlin; Stephen A. Aidlin; Alan Frank; Larry K. Kincaid; Robert Ledwith; Brent A. Murphy, all c/o Aidlin Automation Corporation P.O. Box 13125, Sarasota, Fla. 34278-3125

[21] Appl. No.: 83,451
[22] Filed: Jun. 28, 1993
[51] Int. Cl.⁶ .......................................... B65G 51/02
[52] U.S. Cl. .................................. 406/88; 198/836.3
[58] Field of Search .......................... 406/88, 86, 83; 198/836.3

[56] References Cited

U.S. PATENT DOCUMENTS

| | | | |
|---|---|---|---|
| 3,722,663 | 3/1973 | Nalbach | 198/836.3 X |
| 3,854,688 | 12/1974 | Shuford | 198/836.3 X |
| 4,161,919 | 11/1979 | Smith et al. | 406/88 X |
| 4,284,370 | 8/1981 | Danler et al. | 406/86 |
| 4,312,697 | 1/1982 | Brummett | 198/836.3 X |
| 4,822,214 | 4/1989 | Aidlin et al. | 406/88 X |
| 4,932,517 | 6/1990 | Johnson | 198/836.3 X |
| 5,028,174 | 7/1991 | Karass | 406/88 |
| 5,147,153 | 9/1992 | Aidlin et al. | 406/86 |
| 5,246,314 | 9/1993 | Smith et al. | 406/88 X |

FOREIGN PATENT DOCUMENTS

1259791  1/1968  Germany ........................ 406/83

Primary Examiner—David M. Mitchell
Assistant Examiner—Gary C. Hoge
Attorney, Agent, or Firm—Michael J. Colitz, Jr.

[57] ABSTRACT

Apparatus for conveying articles along a path of travel, the articles being of the type having an upper portion for being supported by the apparatus, a lower portion for being suspended from the apparatus and a low-angle transition portion therebetween, the apparatus comprising in combination a conveyor defining a path of travel along its length with neck rails for receiving the upper portions of the article to be conveyed, a pressure source operatively coupled to the conveyor to move the received articles to be conveyed, and control brushes coupled with respect to the conveyor along at least a portion of the path of travel to contact the lower portions of the bottles while being moved for providing a rearwardly directed angle to the articles to thereby abate the forward and rearward swinging of the articles.

17 Claims, 5 Drawing Sheets

METHOD AND APPARATUS FOR CONVEYING BOTTLES

BACKGROUND OF THE INVENTION

1. Field of the Invention

This invention relates to a method and apparatus for conveying bottles and, more particularly, to pneumatically conveying plastic bottles suspended from neck rails while applying retardation forces to the lower portions of the bottles.

2. Description of the Background Art

Many types of plastic bottles are in wide use today throughout the carbonated beverage and other industries, in large part, to their economical cost to manufacture. Such plastic bottles are usually formed from injection molded parisons having threaded upper necks, lower cylinders closed at the bottom, and neck support rings therebetween. The parisons are then blow molded beneath the neck support rings into the desired size and shape by heating the parisons in molds while blowing air internally.

Blow molded plastic bottles have been traditionally shaped with cylindrical side walls throughout the majority of their lower extents and with high-angle, conically-shaped, transition portions between the upper ends of the cylindrical side walls and the neck support rings. The transition portions thus functions to join the upper, small diameter, threaded portions with the lower, large diameter, side wall portions.

Efforts to fabricate plastic bottles in other than such traditional shape have been largely unsuccessful. This is because, when in storage, gasses are released from the liquid of the carbonated contents which results in forces tending to expand the plastic of the bottles outwardly. As a result, any non-traditional shapes molded into plastic bottles become distorted.

Recent developments in plastic bottle technology, developments in materials, bottle design and molding techniques, have resulted in the ability to fabricate structurally sound plastic bottles in a wide variety of complex, non-traditional shapes. Along with the newly found capability of fabricating complex shapes into plastic bottles comes disadvantages. Such disadvantages arise in conveying the plastic bottles through various processing stations of the automated fabrication process.

Specifically, plastic bottles are normally conveyed while suspended by their neck support rings from spaced parallel neck rails. The bottles are conveyed continuously, in a contiguous orientation with the cylindrical side walls of all bottles in a fed stream touching the next adjacent bottles, with each bottle touching the next adjacent bottles at points in the front and in the back and with the bottles touching a control brush along a line. The motive force for conveying is supplied by a high volume, low pressure plenum chamber above the neck rails. The directional force for conveying is supplied through louvers in the plenum chamber walls. Side rails preclude lateral shifting of the bottles while being conveyed. Forward and rearward swinging of the bottles occurs to a limited extent but is not a significant problem with traditionally shaped bottles due to high angle of the conical transition portions between the neck support rings and the upper ends of the cylindrical side walls.

It has been found, however, that conveying problems arise when plastic bottles are fabricated in other than the traditional shape. With the upper threaded portions and neck rings being essentially standard for all plastic bottles, the most severe problems arise when plastic bottles are formed with conical transition portions with low angles, tapers of bottle profile or non-round cross-sectional profiles. Problems also arise when the lower portions beneath the transition portions have a reduced diameter or when the axial dimensions of the transition portions are of reduced lengths.

The most significant conveying problems arise from forward and rearward swinging of non-traditional bottles which causes the neck portions and neck support rings of adjacent bottles to contact, overlap and lock. When this occurs, the portions of the bottles beneath the locked neck rings have their axes fixed in an inverted V-shaped configuration rather than the preferred orientation where the axes of all conveyed bottles are parallel in an essentially vertical direction. Such locking of neck portions and neck support rings invariably results in a misfeed of the bottles being conveyed thereby requiring a shut-down of the system until the neck portions and neck rings are unlocked and the misfeed is corrected, a loss of time and money. Although misfeeds of this type may occur along any region of the feed path of a pneumatic conveyor, they most frequently occur at regions where the bottles are moving around a curve, immediately approaching a curve or immediately following a curve. They also occur at regions where the speed of the conveyed bottles is changed, to faster or to slower.

Pneumatic conveying systems for plastic bottles with neck rings are in wide use today and are described in the patent literature. Note for example, U.S. Pat. Nos. 4,284,370 to Danier and 4,822,214 to Aidlin. No known pneumatic conveying system, however, has the capability to handle plastic bottles with non-traditional shapes without misfeeds arising from neck ring locking.

Accordingly, it is an object of the present invention to provide an apparatus for conveying articles along a path of travel, the articles being of the type having an upper portion for being supported by the apparatus, the articles being of the type having a lower portion for being suspended from the apparatus, the apparatus comprising, in combination, a conveyor defining a path of travel along its length with means for receiving the upper portions of the article to be conveyed; motion imparting means to move the received articles to be conveyed; and retardation means coupled with respect to the conveyor along at least a portion of the path of travel to contact the lower portions of the bottles while being moved for providing a rearwardly directed angle to the articles while being moved to thereby abate the forward and rearward swinging of the articles while being moved.

It is a further object of the invention to provide a method of conveying plastic bottles along a path of travel, the bottles being of the type having a small diameter threaded upper portion, a large diameter lower portion, a low-angle transition portion therebetween, and a neck ring between the upper portion and the transition portion, the method comprising the steps of: providing a conveyor defining a path of travel along its length with means for receiving the upper portions of the bottles to be conveyed; providing motion imparting means to move the received bottles to be conveyed along the path of travel; and retarding the motion of the bottles as they are being conveyed by contacting the lower portions of the bottles for providing a rearwardly directed angle to the articles to thereby abate the forward and rearward swinging of the bottles while being moved.

It is a further object of the invention to convey plastic bottles, having a wide variety of shapes, while suspended by neck rings in a more efficient, reliable and rapid manner.

It is a further object of the invention to abate misfeeds of bottles conveyed by pneumatic conveyors.

It is a further object of the invention to apply a retarding force to the lower portions of bottles being conveyed for thereby eliminating forward and rearward swinging with attendant neck ring locking.

It is a further object of the invention to control bottles to cause them to assume a position for preventing jamming thereof.

It is a further object of the present invention to provide guide rails for retarding a profile bottle from assuming an undesirable position relative to a horizontal axis perpendicular to the direction of bottle path of travel.

It is a further object of the invention to more efficiently handle non-traditionally shaped bottles with low-angle transition portions.

These objects should be construed to be merely illustrative of some of the more prominent features and applications of the intended invention. Many other beneficial results can be obtained by applying the disclosed invention in a different manner or by modifying the invention within the scope of the disclosure. Accordingly, other objects and a more comprehensive understanding of the invention may be obtained by referring to the summary of the invention, and the detailed description of the preferred embodiment in addition to the scope of the invention defined by the claims taken in conjunction with the accompanying drawings.

SUMMARY OF THE INVENTION

The invention is defined by the appended claims with the specific embodiment shown in the attached drawings. For the purposes of summarizing the invention, the invention may be incorporated into an apparatus for pneumatically conveying plastic bottles. The bottles are of the type having a small diameter threaded upper portion, a large diameter lower portion, a low-angle, transition portion therebetween. The bottles include a neck support ring between the upper portion and the transition portion. The apparatus comprises a pair of laterally spaced neck rails. The neck rails define a path of travel along their lengths and have upper surfaces to receive the neck rings of the bottles to be conveyed. Further, the apparatus comprises a plenum chamber having directional louvers coupled to the upper surfaces of the neck rails. A pressure source is operatively coupled to the plenum chamber whereby, when activated, air under pressure will fill the plenum chamber, moves through the louvers and conveys bottles suspended on the neck rails along the path of travel. Additionally, a pair of upper guide rods extend along the path of travel and are laterally disposed adjacent to the opposite sides of the upper extents of the bottles being conveyed to preclude lateral shifting and upward movement of the conveyed bottles. A pair of lower guide rods extends along the path of travel and are laterally disposed adjacent to the opposite sides of the lower extents of the bottles being conveyed to preclude lateral shifting of the conveyed bottles. The apparatus further comprises support bar assemblies. The support bar assemblies couple the upper and lower guide rods with respect to the neck rails and have adjustment means to effect the varying of both the lateral and elevational locations of the upper and lower guide rods with respect to the bottles being conveyed. Finally, the apparatus includes control brushes. The control brushes are fixedly coupled with respect to the lower guide rods along at least a portion of the path of travel of travel to contact the lower extents of the bottles while being conveyed for causing a rearwardly directed angle, wherein a line connecting the upper and lower ends of the transition portion of the bottle being conveyed forms an angle between about 28 and 30 degrees plus or minus 10 percent with respect to the axis of the bottle to thereby abate the possibility of neck ring contact and locking.

The invention may also be incorporated into a method of conveying plastic bottles of the type having a small diameter threaded upper portion, a large diameter lower portion, a low-angle transition portion therebetween, and a neck ring between the upper portion and the transition portion along a path of travel. The method comprises the step of providing a conveyor defining a path of travel along its length with means for receiving the upper portions of the bottles to be conveyed. Thereafter, the method provides motion imparting means to move the received bottles to be conveyed along the path of travel. Finally, the method retards the motion of the bottles as they are being conveyed by contacting the lower portions of the bottles for providing a rearwardly directed angle to the articles to thereby abate the forward and rearward swinging of the bottles while being moved.

The foregoing has outlined rather broadly, the more pertinent and important features of the present invention. The detailed description of the invention that follows is offered so that the present contribution to the art may be more fully appreciated. Additional features of the invention will be described hereinafter. These form the subject of the claims of the invention. It should be appreciated by those skilled in the art that the conception and the disclosed specific embodiment may be readily utilized as a basis for modifying or designing other methods and structures for carrying out the same purposes of the present invention. It should also be realized by those skilled in the art that such equivalent methods and structures do not depart from the spirit and scope of the invention as set forth in the appended claims.

BRIEF DESCRIPTION OF THE DRAWINGS

For a more succinct understanding of the nature and object of the invention, reference should be directed to the following description taken in conjunction with the accompanying drawings in which.

Similar reference numerals refer to similar parts throughout the several Figures.

DETAILED DESCRIPTION OF THE PREFERRED EMBODIMENT OF THE INVENTION

Figure 1:
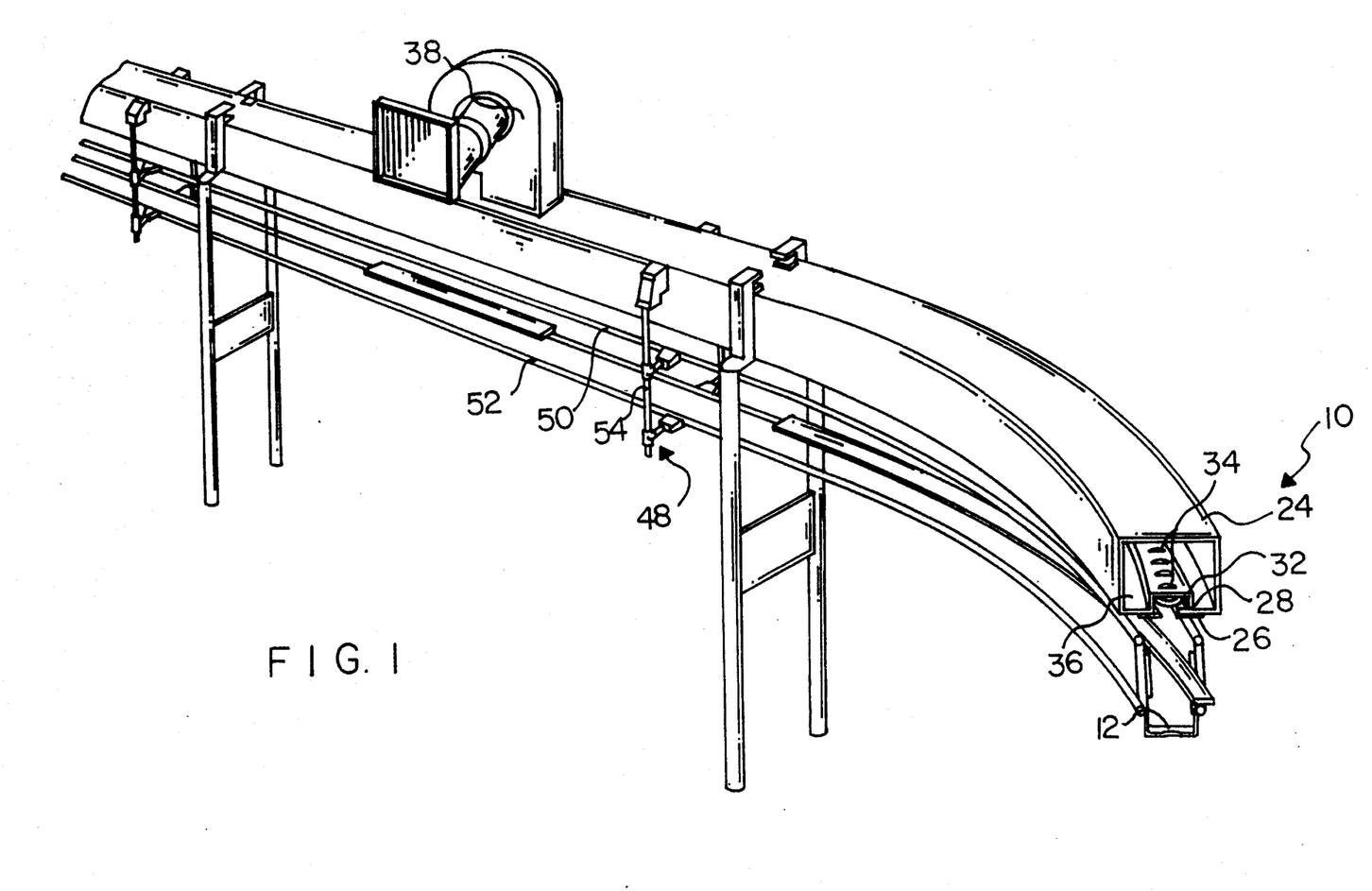
FIG. 1 is a perspective illustration of a conveyor system constructed in accordance With the principles of the present invention.
Figure 2:
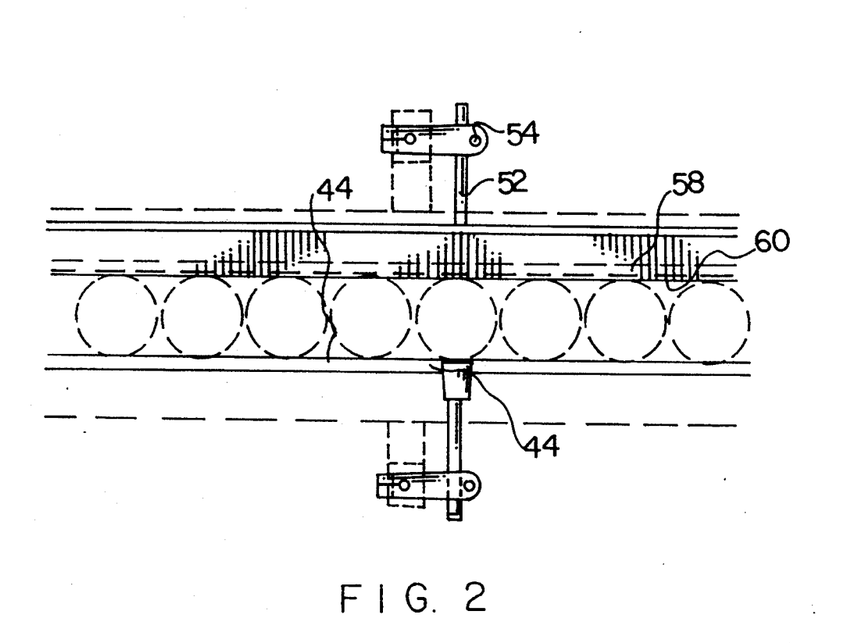
FIG. 2 is a plan view of the conveyor system showing bottles being conveyed contacting the control brushes.
Figure 3:
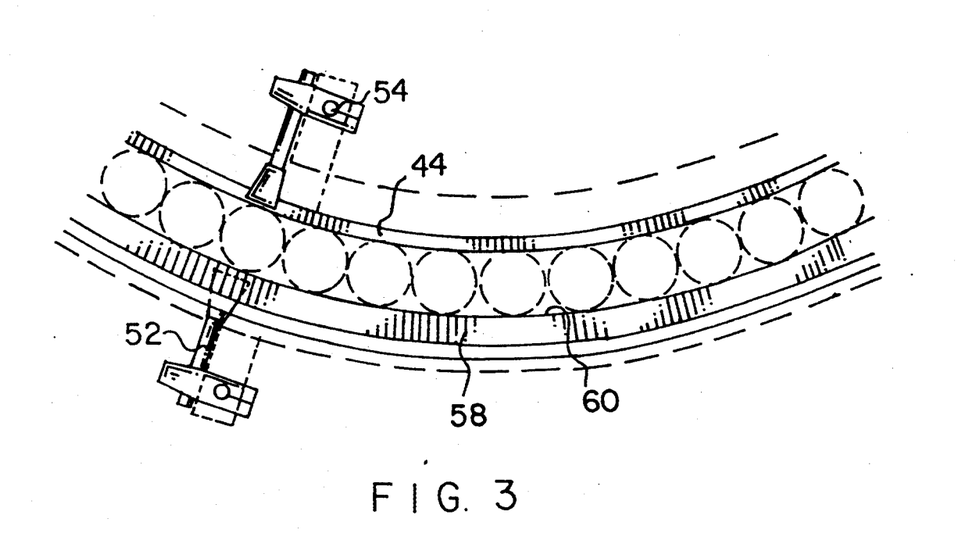
FIG. 3 is a plan view of the conveyor system showing bottles being conveyed along a horizontal curve contacting the control brushes.

Shown in the Figures, with particular reference to FIG. 1, there is shown an apparatus 10 for pneumatically conveying articles or plastic bottles 12. The bottles are preferably of the type having a small diameter threaded upper portion 14, a large diameter lower portion 16 and a low-angle, transition portion 18 therebetween. Further, the bottles have a neck support ring 20 between the upper portion and the transition portion.

Figure 4:
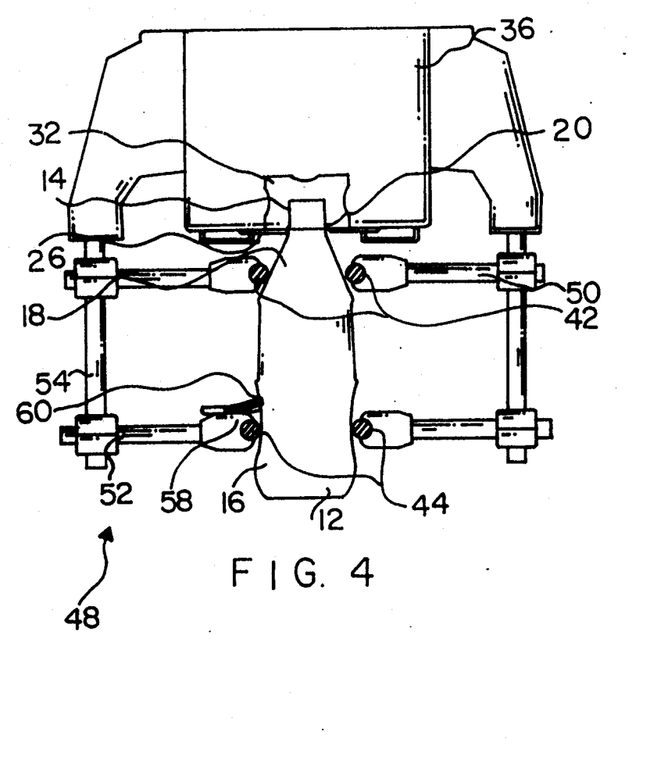
FIG. 4 is a cross-sectional view of the conveyor system showing a bottle being conveyed therealong.

The central component of the apparatus 10 is a conveyor 24 defining a path of travel along its length with means for receiving the upper portions of the article to be conveyed. Preferably, the conveyor comprises a pair of laterally spaced neck rails 26. As shown in FIGS. 1 and 4, the neck rails define the path of travel along their lengths. The neck rails have upper surfaces for receiving the neck rings of the bottles being conveyed. A space 28 between the neck rails defines an elongated slot therebetween. The slot slidably supports a bottle by its neck ring.

The apparatus further includes a plenum chamber 32. The plenum chamber is coupled to the upper surfaces of the neck rails. See FIG. 4. Further, the plenum includes directional louvers 34. In the preferred embodiment, the plenum chamber is formed of an inverted, U-shaped, interior channel member. This member extends upwardly from the neck rails and spans the slot. The member has a cross-sectional area sufficient to receive portions of the bottles above their neck rings. The interior channel member has a top wall and side walls coupled to the neck rails. Additionally, the top wall and side walls are all formed with air directing louvers formed therein as shown in FIG. 4. The air directing louvers provide a driving force for the bottles along the path of travel.

Furthermore, an inverted U-shaped, exterior channel member 36 is also coupled to the neck rails. The exterior channel member, like the interior channel member, extends upwardly from the path of travel and neck rails and encloses the interior channel member. The exterior channel member extends longitudinally the length of the slot.

A motion imparting means is provided to move the received bottles to be conveyed. Preferably, the motion imparting means is a pressure source or fan 38 operatively coupled to the plenum chamber. When activated, air under pressure fills the plenum chamber and thereafter moves through the louvers to thereby convey the bottles which are suspended on the neck rails along the path of travel. See FIG. 1.

The apparatus further includes a pair of upper guide rods 42. The upper guide rods are positioned along the path of travel and are laterally disposed adjacent to the opposite sides of the upper extents of the bottles. As the bottles are conveyed, the upper guide rods preclude lateral shifting of the bottles. Further, the upper guide rails prevent the bottles from raising during movement thereof as illustrated in FIG. 4. The transition portion of the bottles contacts the upper guide rods for precluding the upward movement of the bottles. In the preferred embodiment, the upper guide rods are formed of rods suspended from the neck rails on opposite sides of the slot along the length of the slot.

Additionally, the apparatus comprises a pair of lower guide rods 44. The lower guide rods are positioned along the path of travel and are laterally disposed adjacent to the opposite sides of the lower extents of the bottles. As the bottles are conveyed, the lower guide rods preclude lateral shifting of the conveyed bottles. In the preferred embodiment, the lower guide rods are formed of rods suspended from the neck rails below the upper guide rods on opposite sides of the slot along the length of the slot.

Figure 5:
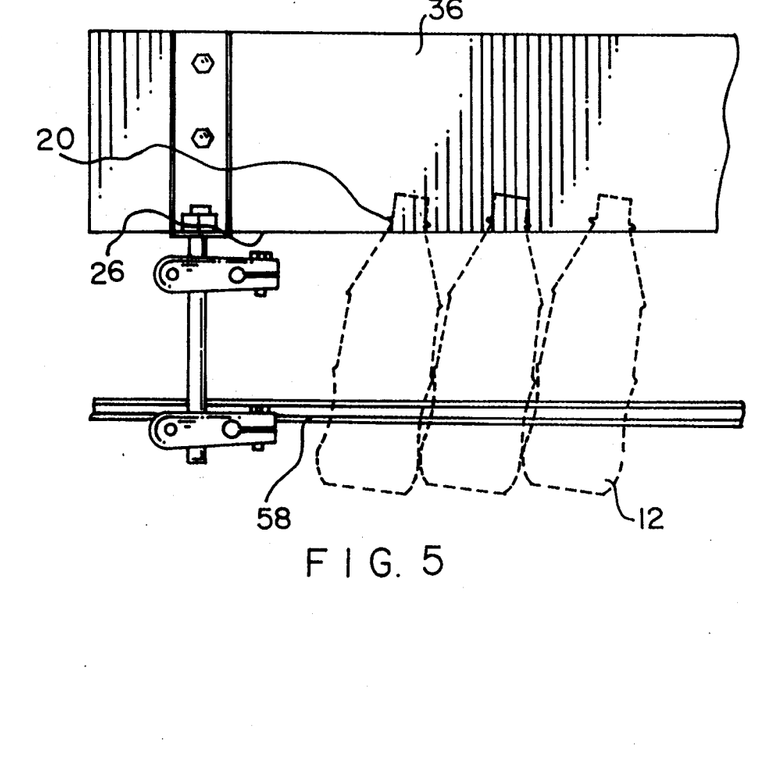
FIG. 5 is a side elevational view of the conveyor system showing a bottle being conveyed therealong.

Further, support bar assemblies 48 are included in the apparatus on each side of the path of travel coupled to the exterior channel member 36. The support bar assemblies couple the upper and lower guide rods with respect to the neck rails. See FIGS. 4 and 5. The support bar assemblies have adjustment means to effect the varying of both the lateral and elevational locations of the upper and lower guide rods with respect to the bottles being conveyed. Further, the support bar assemblies include horizontal supports 50 and 52 interconnected adjustably with vertical supports 54 coupled to the exterior channel member 36, one each side of the path of travel, to change rod position as a function of the bottle to be conveyed. Such adjustment means include the adjustable brackets supporting the horizontal and vertical support rods 56 and 54. Note FIGS. 2-7.

Finally, in the preferred embodiment, the apparatus includes retardation means 58. The retardation means are coupled with respect to the conveyor along at least a portion of the path of travel. The retardation means contact the lower portions of the bottles while being moved. The retardation means provides a rearwardly directed angle to the bottles while being moved to thereby abate the forward and rearward swinging of the bottles while being moved. Note FIG. 5. In the preferred embodiment, the retardation means are control brushes 60 along the path of travel with flexible bristles extending along the path of travel in contact with the bottles being conveyed along the path of travel. Preferably, the control brushes are fixedly coupled, as by welding or the like, with respect to the lower guide rods as shown in FIG. 4. However, the control brushes may be removably secured to the support bar assembly. See FIG. 7. C-clamps removably couple the control brushes to the horizontal supports 52.

The control brushes are along at least a portion of the path of travel to contact the lower extents of the bottles to impart a rearwardly directed angle to the bottles and to push the bottles into sliding contact with the lower guide rod opposite the control brushes as they are conveyed to thereby abate the possibility of neck ring contact and locking. In the preferred embodiment, the brushes are located on one side of the path of travel to tilt the bottles to about 15 degrees plus or minus 10 percent from the vertical.

Figure 8:
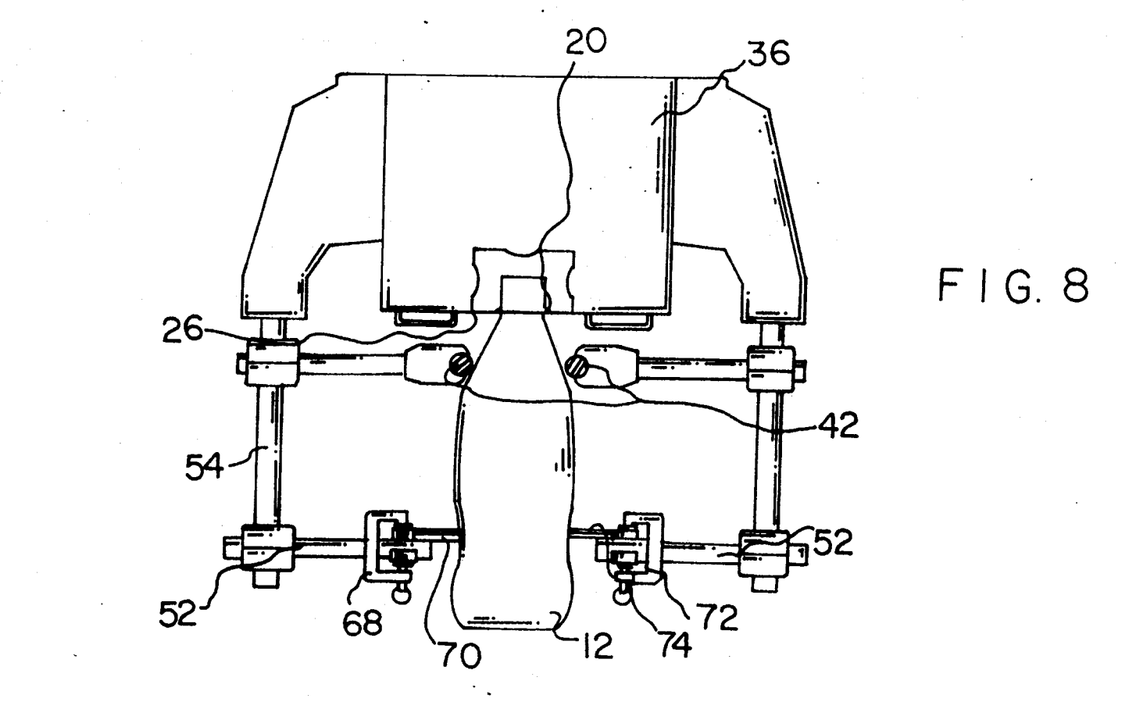
FIG. 8 is a cross-sectional view of a further alternate embodiment of the conveyor system having removable control brushes located on both sides of the path of travel.

However, in an alternate embodiment illustrated in FIG. 8, the brushes 70 and 74 are located on both sides of the path of travel and deflect the conveyed bottles rearwardly about 15 degrees from the vertical. C-clamps 68 and 72 removably couple the control brushes to the horizontal supports 52. While the bottles are in sliding contact with the brushes, the bottles are precluded from swinging and thereby having neck ring contact and locking. The placement of brushes at various locations along the path of travel assures the bottles travel with force against the lower half of the bottle to thereby cause the base of the bottles to trail the neck rings causing the bottles to travel at an angle of about 15 degrees plus or minus 10 percent from the vertical to abate neck ring contact and locking.

In a further alternate embodiment, the path of travel is a curve. See FIG. 3. The curve is an essentially horizontal curve having brushes extending along the curve. When bottles are conveyed along horizontal a curve, centrifugal inertial forces cause the lower ends of the bottles being conveyed to swing laterally from the path of travel at an angle such that the lower ends of the bottles are positioned outside of the curve. The brushes are positioned on the outside of the curve to counteract the inertial forces acting on the bottles and to impart a force against the lower half of the bottle to thereby cause the base of the bottles to trail the neck rings causing the bottles to travel at an angle of about 15 degrees plus or minus 10 percent from the vertical to abate neck ring contact and locking and precluding swinging thereof.

In a still further alternate embodiment, the curve of the path of travel is an essentially vertical plane. The vertical curve has control brushes associated therewith as described above for allowing the bottles to be conveyed from one elevation to another elevation without neck ring locking. When bottles are conveyed off the vertical, forward and rearward swinging of the bottles occurs which results in neck ring lock. The brushes are positioned along the vertical curve such that the brushes impart a constant rearwardly directed angle of about 15 degrees plus or minus 10 percent to the bottles as they are being conveyed along the vertical curve.

Figure 6A:
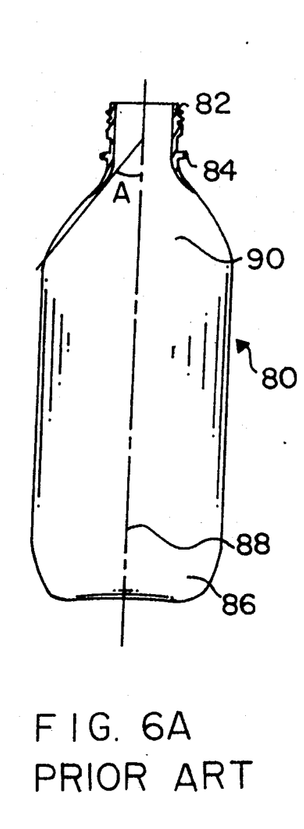
FIG. 6a is a cross-sectional view of a conventional bottle.
Figure 6B:
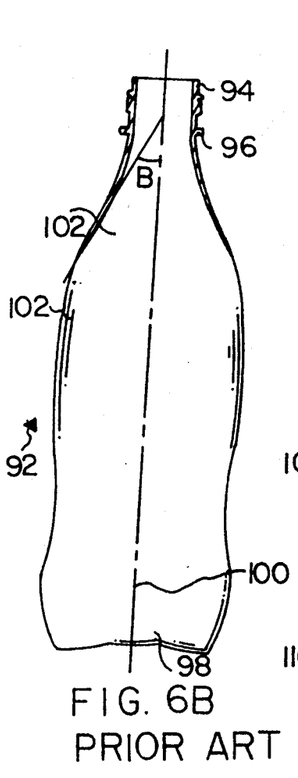
FIG. 6b is a cross-sectional view of a bottle of the type having a small diameter threaded upper portion, a large diameter lower portion, a low-angle, a transition portion therebetween, and a neck support ring between the upper portion and the transition portion.
Figure 6C:
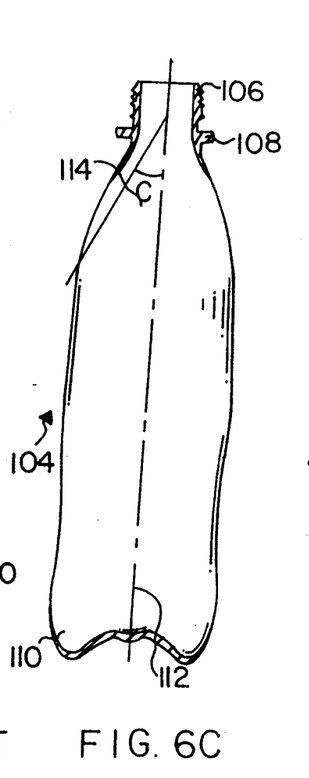
FIG. 6c is a cross-sectional view of an alternate bottle of the type having a small diameter threaded upper portion, a large diameter lower portion, a low-angle, a transition portion therebetween, and a neck support ring between the upper portion and the transition portion.
Figure 7:
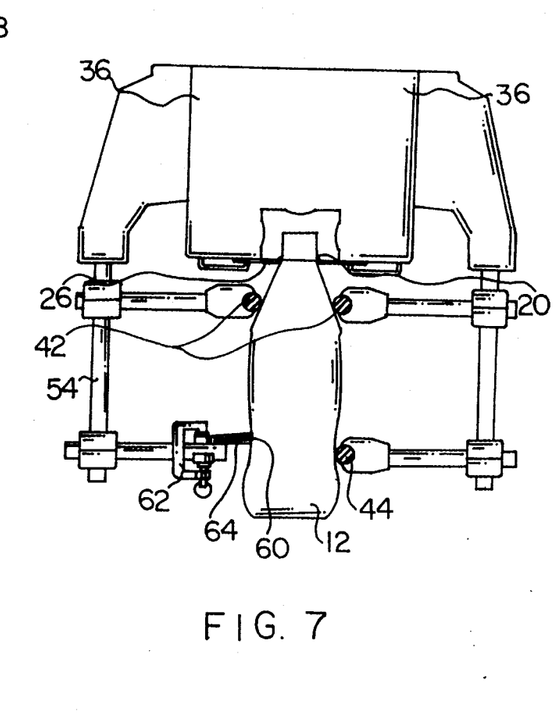
FIG. 7 is a cross-sectional view of an alternate embodiment of the conveyor system having removable control brushes.

Plastic bottles are formed from injection molded parisons having threaded upper necks, lower cylinders closed at the bottom, and neck support rings therebetween. The parisons are then blow molded beneath the neck support rings into the desired size and shape by heating the parisons in molds while blowing air internally. Conventional plastic bottles 80 have been traditionally shaped with cylindrical side walls throughout the majority of their lower extents 86 and with high-angle, conically-shaped, transition portions 90 between the upper ends of the cylindrical side walls and the neck support rings 84. The transition portion of a conventional bottle forms an obtuse angle, A, with the central axis 88 of the bottle of about 50 degrees to join the upper, small diameter, threaded portions 82 with the lower, large diameter, side wall portions 86. Note FIG. 6a. However, domestic non-traditional bottle shapes have low angle transition portions and non-round cross-sectional profiles. Note FIG. 6b. Typically, domestic non-traditional bottle shapes have a transition portion 102 that forms an acute angle, B, with the central axis 100 of the bottle of about 30 degrees plus or minus 10 percent to join an upper, small diameter, threaded portion 94 with the lower, large diameter, side wall portions 98. Note bottle 92 with neck ring 96 in FIG. 6B. Additionally, foreign non-traditional bottles are now being manufactured. FIG. 6c illustrates foreign non-traditional bottle shapes which have a transition portion 114 that form an acute angle, C, with the central axis 112 of the bottle of about 28 degrees plus or minus 10 percent to join an upper, small diameter, threaded portion 106 with the lower portion 110. Note bottle 92 with neck ring 96 in FIG. 6B.

In operation and use of the apparatus of the present invention, there is provided a method of conveying plastic bottles. The above descriptions relate to an apparatus 10 for conveying plastic bottles 12 of the type having a small diameter threaded upper portion 14, a large diameter lower portion 16, a low-angle, transition portion 18 therebetween, and a neck ring 20 between the upper portion and the transition portion.

More specifically, the method includes providing a conveyor 24. The conveyor defines a path of travel along its length with means for receiving the Upper portions of the bottles to be conveyed as described above.

Next, the method provides motion imparting means 38. The motion imparting means, as described above, moves the received bottles to be conveyed along the path of travel as previously discussed.

Thereafter, the method retards the motion of the bottles. As the bottles are conveyed, contacting of the lower portions of the bottles occurs for providing a rearwardly directed angle of about 15 degrees plus or minus 10 percent to the articles. The bottles are thereby abated from forward and rearward swinging while being moved as described above.

In the preferred embodiment, the method forms a line connecting the upper and lower ends of the transition portion. The angle formed thereby is an angle between about 28 and 30 degrees plus or minus 10 percent with respect to the axis of the bottle being conveyed. The lower extents of the bottles to impart a rearwardly directed angle of about 15 degrees plus or minus 10 percent to the bottles as they are conveyed. The rearwardly directed angle thereby abates the possibility of neck ring contact and locking.

The present disclosure includes that contained in the appended claims as well as that of the foregoing description. Although this invention has been described in its preferred form with a certain degree of particularity, it should be understood that the present disclosure of the preferred form has been made only by way of example and that numerous changes in the details of construction and combination and arrangement of parts may be resorted to without departing from the spirit and scope of the invention.

Now that the invention has been described,
What is claimed is:

1. Apparatus for pneumatically conveying plastic bottles of the type having a small diameter threaded upper portion, a large diameter lower portion, a low-angle transition portion therebetween, and a neck support ring between the upper portion and the transition portion, the apparatus comprising:

a pair of laterally spaced neck rails defining a path of travel along their lengths, the neck rails having upper surfaces to receive the neck rings of the bottles to be conveyed;

a plenum chamber coupled to the upper surfaces of the neck rails, the plenum chamber having directional louvers;

a pressure source operatively coupled to the plenum chamber whereby, when activated, air under pressure will fill the plenum chamber, move through the louvers and convey bottles suspended on the neck rails along the path of travel;

a pair of upper guide rods along the path of travel and laterally disposed adjacent to the opposite sides of the upper extents of the bottles being conveyed to preclude lateral shifting and upward movement of the conveyed bottles;

a pair of lower guide rods along the path of travel and laterally disposed adjacent to the opposite sides of the lower extents of the bottles being conveyed to preclude lateral shifting of the conveyed bottles;

support bar assemblies coupling the upper and lower guide rods with respect to the neck rails, the support bar assemblies having adjustment means to effect the varying of both the lateral and elevational locations of the upper and lower guide rods with respect to the bottles being conveyed; and control brushes fixedly coupled with respect to the lower guide rods along at least a portion of the path of travel to contact the lower extents of the bottles while being conveyed for causing a rearwardly directed angle to the bottles being conveyed to thereby abate the possibility of neck ring contact and locking.

2. Apparatus for conveying articles along a path of travel, the articles being of the type having an upper portion for being supported by the apparatus, the articles being of the type having a lower portion for being suspended from the apparatus, the apparatus comprising in combination:

a conveyor defining a path of travel along its length with means for receiving the upper portions of the article to be conveyed;

motion imparting means to move the received articles to be conveyed; and flexible retardation means coupled with respect to the conveyor continuously along at least a portion of the path of travel to contact the lower portions of the articles while being moved for providing a rearwardly directed angle to the articles while being moved to thereby abate the forward and rearward swinging of the articles while being moved.

3. The apparatus as set forth in claim 2 wherein the retardation means are brushes with flexible bristles in contact with the bottles being conveyed.

4. The apparatus as set forth in claim 3 wherein the brushes are located on one side of the path of travel.

5. The apparatus as set forth in claim 3 wherein the brushes are located on one side of the path of travel and deflect the conveyed bottles toward a laterally disposed guide rail.

6. The apparatus as set forth in claim 3 wherein the brushes are located on one side of the path of travel and deflect the conveyed bottles into continuous riding contact with a laterally disposed guide rail.

7. The apparatus as set forth in claim 3 wherein the brushes are located on both sides of the path of travel.

8. The apparatus as set forth in claim 3 wherein the path of travel is a curve and the brushes extend along the curve.

9. The apparatus as set forth in claim 8 wherein the curve is in an essentially horizontal plane.

10. The apparatus as set forth in claim 2 and further including a pair of lower guide rods along the path of travel and laterally disposed adjacent to the opposite sides of the lower extents of the bottles being conveyed to preclude lateral shifting of the conveyed bottles.

11. The apparatus as set forth in claim 10 and further including a pair of upper guide rods along the path of travel and laterally disposed adjacent to the opposite sides of the upper extents of the bottles being conveyed to preclude lateral shifting of the conveyed bottles.

12. The apparatus as set forth in claim 11 and further including support bar assemblies coupling the upper and lower guide rods with respect to neck rails supporting the bottles, the support bar assemblies having adjustment means to effect the varying of both the lateral and elevational locations of the upper and lower guide rods with respect to the bottles being conveyed.

13. The apparatus as set forth in claim 2 and further including the articles being conveyed which are plastic bottles of the type having a small diameter threaded upper portion, a large diameter lower portion, a low-angle transition portion therebetween, and a neck support ring between the upper portion and the transition portion, wherein a line connecting the upper and lower ends of the transition portion forms an acute angle with respect to the axis of the bottle being conveyed.

14. The apparatus as set forth in claim 13 wherein the line connecting the upper and lower ends of the transition portion forms an angle between about 28 and 30 degrees plus or minus 10 percent with respect to the axis of the bottle being conveyed.

15. The apparatus as set forth in claim 2 wherein the rearwardly directed angle is about 15 degrees plus or minus 10 percent.

16. A method of conveying plastic bottles along a path of travel, the bottles being of the type having a small diameter threaded upper portion, a large diameter lower portion, a low-angle transition portion therebetween, and a neck ring between the upper portion and the transition portion, the method comprising the steps of:

providing a conveyor defining a path of travel along its length with means for receiving the upper portions of the bottles to be conveyed;

providing motion imparting means to move the received bottles to be conveyed along the path of travel; and retarding the motion of the bottles as they are being conveyed by continuously contacting the lower portions of the bottles along a path of travel for providing a rearwardly directed angle to the articles to thereby abate the forward and rearward swinging of the bottles while being conveyed.

17. The method as set forth in claim 16 wherein a line connecting the upper and lower ends of the transition portion form an angle between about 28 and 30 degrees plus or minus 10 percent with respect to the axis of the bottle being conveyed.

* * * * *